United States Patent [19]

Cunningham

[11] 4,321,025
[45] Mar. 23, 1982

[54] EXTRUSION DIE

[75] Inventor: George M. Cunningham, Horseheads, N.Y.

[73] Assignee: Corning Glass Works, Corning, N.Y.

[21] Appl. No.: 148,797

[22] Filed: May 12, 1980

[51] Int. Cl.³ .............................................. B28B 3/26
[52] U.S. Cl. ................... 425/131.1; 228/175; 425/463; 425/466; 425/467
[58] Field of Search ............... 425/461, 463, 466, 467, 425/131.1; 228/174, 175

[56] References Cited

U.S. PATENT DOCUMENTS

| | | | |
|---|---|---|---|
| 1,492,594 | 5/1924 | Dreyfus et al. | 425/461 |
| 3,081,490 | 3/1963 | Heynen et al. | 425/463 |
| 3,095,607 | 7/1963 | Cobb | 425/463 |
| 3,188,689 | 6/1965 | Breen | 425/463 |
| 3,279,284 | 10/1966 | Ogden et al. | 228/124 X |
| 3,441,996 | 5/1969 | Boothe | 228/174 X |
| 3,814,561 | 6/1974 | Matsui et al. | 425/463 X |
| 4,118,456 | 10/1978 | Blanding et al. | 425/464 X |

FOREIGN PATENT DOCUMENTS 1101452  1/1968  United Kingdom ............... 425/463

Primary Examiner—Philip Anderson
Attorney, Agent, or Firm—Richard N. Wardell

[57] ABSTRACT

Disclosed is an extrusion die for use in forming extruded honeycomb structures employing a face plate having a plurality of discharge slots and a back plate having a plurality of feed passageways. The face plate and the back plate are joined to one another by means of bonding, e.g. brazing, at the joint formed by abutting surfaces of the plates. Proper orientation between the face plate and the back plate are maintained during brazing such that the feed passageways and discharge slots remain properly associated by means of a plurality of alignment cavities having walls opening to and diverging toward and to the joint between the face plate and back plate. Pedestals project across the joint and mate with the alignment cavities such that movement between the back plate and face plate is permitted during the thermal expansion caused by brazing only in the direction perpendicular to the joint, thus assuring proper registry between feed holes and discharge slots which precludes failure of the brazed joint during extrusion.

17 Claims, 11 Drawing Figures

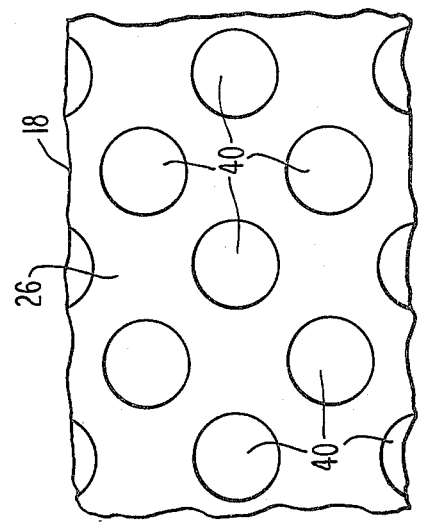
Fig. 7
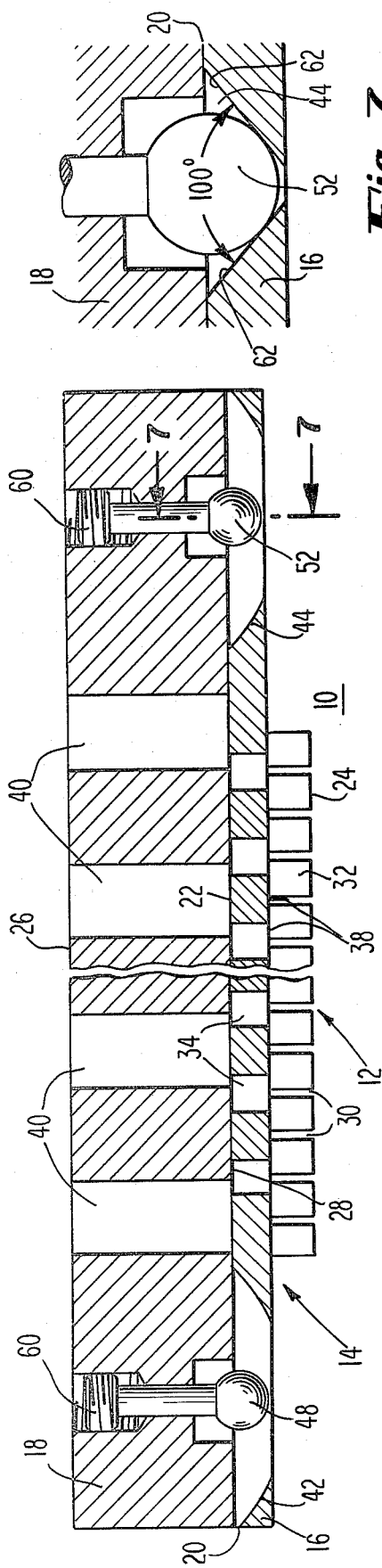
Fig. 3
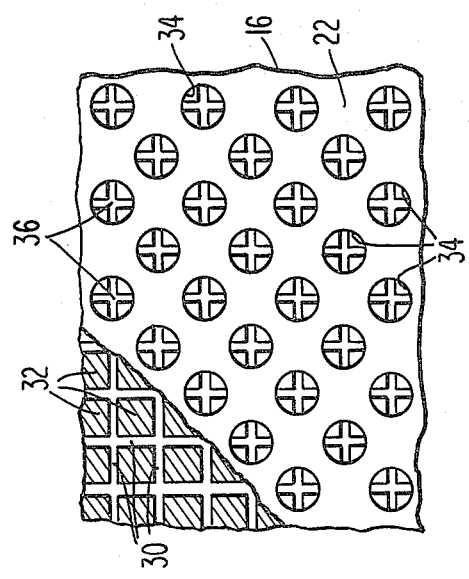
Fig. 6
Fig. 5
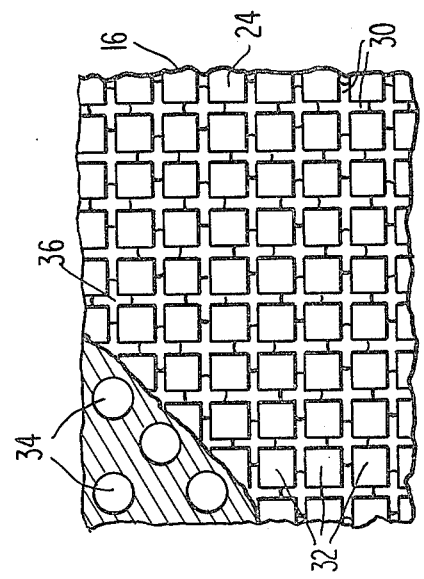
Fig. 4

EXTRUSION DIE

BACKGROUND OF THE INVENTION

This invention relates to extrusion dies for manufacturing extrudable articles from materials such as ceramic batches, molten glass, plastics, molten metals, and similar materials, which have the property of being able to flow or plasticly deform during extrusion while being able to become sufficiently rigid immediately thereafter so as to maintain their structural integrity. More particularly, the present invention relates to an improved extrusion die which is possessed with greater precision and accuracy than that known to the prior art.

An extrusion die of the general type with which the present invention is useful is disclosed in U.S. Pat. No. 3,790,654 to R. D. Bagley. Disclosed therein is an extrusion die for making honeycomb structures. The extrusion die disclosed by Bagley includes a large plurality of feed passageways which communicate with a still larger plurality of discharge slots. While disclosed by Bagley to be a unitary structure, it is known to form extrusion dies of the type shown therein by the joinder of two separate parts. U.S. Pat. No. 4,118,456 to Blanding and Van Dewoestine discloses such a two part die. The first of these parts is a unitary structure known as a backplate or die which is perforated by a large plurality of the aforementioned feed passageways. The second part is also a unitary body which is provided with a larger plurality of discharge holes and a still larger plurality of discharge slots.

In accordance with the aforementioned Blanding et al patent, it is generally known to bond the first and second parts together, for example, by brazing.

As must be apparent to those skilled in the art, the precise alignment of discharge slots vis a vis their associated feed passageways is critical to the extrusion of a honeycomb structure having uniform sized openings therein. In the past, when brazing a faceplate having discharge slots to a backplate having feed passageways, thermal expansion and subsequent contraction during and after brazing has, at times, caused misalignment between the discharge slots and feed passageways in the resulting extrusion die. This has occurred even though alignment dowels have been employed between the backplate and the faceplate which are designed to prevent warping and skewing since the faceplate at times binds or catches on the dowels during cooling and contraction, thus causing misalignment and subsequent failure of the brazed joint during extrusion.

It is an object of the present invention to provide an improved extrusion die employing a separate backplate having a plurality of feed passageways and a faceplate having a larger plurality of feed holes communicating with a still larger plurality of discharge slots to be aligned therewith, which are joined by brazing but which does not suffer the disadvantage of misalignment associated with prior art extrusion dies.

SUMMARY OF THE INVENTION

The aforementioned object is accomplished by means of an extrusion die for forming honeycomb structures which, like that disclosed in the aforementioned Blanding et al patent, employs a first body member having an inlet face and an outlet face with a plurality of interconnected discharge slots communicating with the outlet face and a second body member having an entrance and an exit face with a plurality of feed passageways extending through the second body member, the first and second body members being bonded, e.g. brazed, to one another at a joint between the exit face of the second member and the inlet face of the first body member. However, in accordance with the present invention, such an extrusion die is further provided with a first alignment cavity in one of the body members with walls opening to and diverging toward and to the joint and at least another alignment cavity in either the one or the other of the body members with walls opening to and diverging toward and to the joint is also provided. At least first, second and third pedestals are provided on the body member or numbers and which project across or onto the joint. The first and second pedestals project across the joint from the body member or members opposite to and mate with the first and second alignment cavities. In one embodiment, the third pedestal mates with a third alignment cavity, while in another embodiment the pedestal rests directly on the surface of the opposite body member.

In the preferred embodiment of the present invention, the first, second and third pedestals have a rounded extremity and because of the rounded extremity and because the alignment cavities open to and diverge toward and to the joint, during the brazing of the first and second body members, thermal expansion is permitted such that the pedestals ride up in the alignment cavities, however, horizontal misorientation of the first and second body members is precluded. During cooling after brazing, the diverging walls of the alignment slots assure proper orientation of the first and second body members in the vertical direction as well as in the horizontal direction.

BRIEF DESCRIPTION OF THE DRAWING

The present invention will be more easily understood by reference to the accompanying drawing in which:

FIG. 3 is a cross-sectional view in enlarged scale taken along line 3—3 of FIG. 1;

FIG. 4 is a fragmental plan view in enlarged scale of the outlet face of the discharge body member shown in FIG. 2, with a corner portion broken away to show the feed holes formed in the opposite, inlet face of the discharge body member;

FIG. 5 is a fragmental plan view of the inlet face of the discharge body member shown in FIG. 2, with a corner portion broken away to show the discharge slots formed in the opposite outlet face;

FIG. 6 is a plan view in enlarged scale of the entrance face of the feed hole body member forming a portion of the die of FIG. 1;

FIG. 7 is a cross-sectional view taken along line 7—7 in FIG. 3;

DESCRIPTION OF THE PREFERRED EMBODIMENTS

Figure 1:
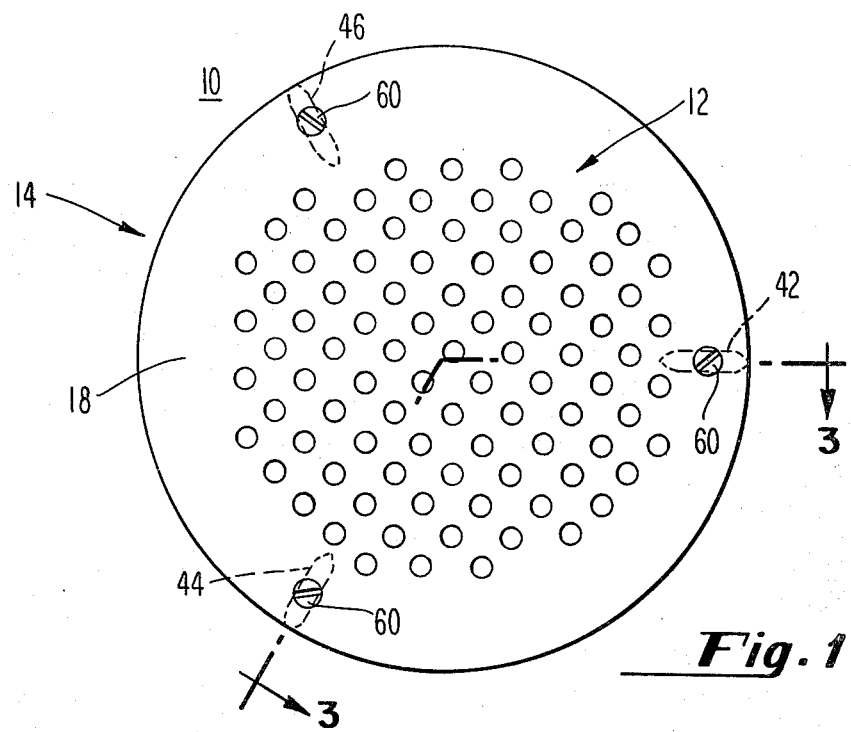
FIG. 1 is a somewhat schematic top view of an extrusion die improved in accordance with the present invention.
Figure 2:
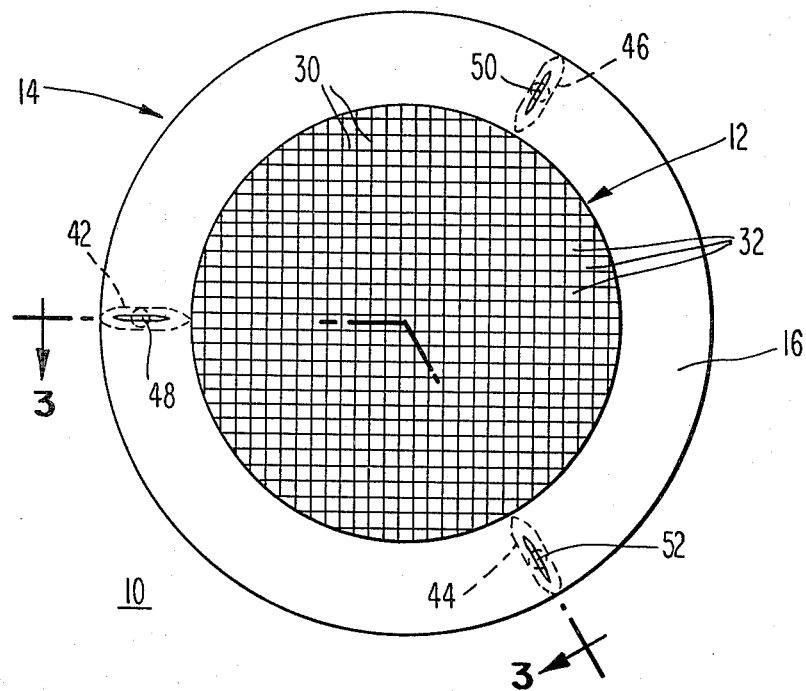
FIG. 2 is a bottom view of the die of FIG. 1.

Referring now to the drawings, and in particular to FIGS. 1-2, an extrusion die for forming honeycomb structures is shown generally at 10. The die 10 includes a central portion 12 and a peripheral portion 14 surrounding the central portion 12. Moreover, as may best be seen from FIG. 3, the die 10 further includes a first body member 16 and a second body member 18. The first and second body members 16 and 18 are secured together at a joint 20 preferably by brazing. The first body member 16 includes an inlet face 22 and an outlet face 24. The second body member 18 includes an entrance face 26 and an exit face 28. The first body member 16 and the second body member 18 are joined with the exit face 28 of the second body member in abutting relationship with the inlet face 22 of the first body member. As may best be seen from FIGS. 2 and 4, the first body member 16 has a plurality of interconnected discharge slots 30 which are formed by the side wall portions of pins 32, formed intermediate the discharge slots 30 in the first body member 16 at the outlet face 24 thereof. As best seen in FIGS. 4 and 5, in the preferred embodiment, a plurality of relatively small sized feed holes 34 are formed in the inlet face 22 of the first body member 16 which communicate with selected portions 36 of the discharge slots 30. As shown in FIG. 3, the feed holes 34 communicate with inner root portions 38 of the discharge slots 30 at intersecting portions 36 of such slots to facilitate the flow of extrudable material.

As may best be seen from FIGS. 3 and 6, the second body member 18 of the extrusion die 10 includes a plurality of relatively larger sized feed passageways 40 which extend through the first body member 18 and between its entrance face 26 and its exit face 28. The feed passageways 40 are of a relatively larger size diameter than the relatively smaller diameter feed holes 34 such that the feed passageways 40 communicate with a plurality of feed holes 34. In the preferred embodiment, each of the feed passageways 40 is large enough to communicate with four feed holes 34, which in turn communicate with the discharge slots 30 at selected intersecting portions 36 through the axial extent of the die.

Because of the importance of proper alignment between the feed passageways 40 and the feed holes 34, in accordance with the present invention, and as best seen in FIGS. 1-3, the body members of the present invention are provided with a plurality of alignment cavities 42-46 which mate with a plurality of pedestals 48-52.

While the present invention as illustrated in FIGS. 1-3 employs three alignment cavities 42-46, and while the utilization of three alignment cavities is preferred, as will be more fully explained below, only two alignment cavities are necessary, however, in any event, at least three pedestals are required. The walls of each of the alignment cavities 42-46 open to and diverge toward and to the joint 20. Moreover, in the preferred embodiment, each of the pedestals have a rounded extremity as shown at FIG. 3.

The provision of alignment cavities which open to and diverge toward and to the joint 20 as well as pedestals 48-52 employing rounded extremities are utilized to prevent the relative movement of the first and second body members 16 and 18 with respect to one another in the horizontal plane of the joint 20 during brazing. However, relative movement in the vertical direction perpendicular to the joint 20 caused by thermal expansion is permitted during brazing and the diverging side walls of the alignment cavities 42-46 ensure that upon cooling and contracting after brazing, the second body member 18 will return to its fully seated position within the alignment cavities 42-46. In this manner, the first and second body member 16 and 18 are restrained from relative movement in two orthogonal directions but are allowed to move relative to one another in a third direcuon during joining.

In the embodiment shown in FIGS. 1-3, the alignment cavities 42-46 are formed in the first body member 16 while the pedestals 48-52 project from the second body member 18. However, those skilled in the art will appreciate that the alignment cavities 42-46 could alternatively be formed in the second body member 18 with the pedestals 48-52 projecting from the first body member 16. Alternatively, either one of the body members 14 or 16 may be formed to include a combination of alignment cavities and pedestals so long as the other body member 16 or 18 includes cavities or pedestals to mate therewith.

In the embodiment shown in FIGS. 1-3, it is preferred that the pedestals be spaced at 120° intervals about the circumference of the exit face 28 of the second body member 18. Moreover, as shown in FIG. 3, it is preferred that the pedestals be adjustable whereby the height thereof above the exit face 28 of the second body member 18 is controllable. Accordingly, threaded means 60 are provided for adjusting the extent of the projection of the pedestal means 48-52.

Referring now to FIG. 7, a cross-section of one of the alignment cavities 44, may be seen. As may be seen from FIG. 7, the walls 62 of the alignment cavity 44 diverge toward and to the joint 20, preferably at an angle of about 100°. Moreover, while the alignment cavities 42, 44 and 46 are shown as longitudinal slots, those skilled in the art will appreciate that conically shaped alignment cavities suffice so long as the walls thereof open to and diverge toward and to the joint 20. However, it is preferred that elongated longitudinal alignment cavities as opposed to conical cavities be employed and that the longitudinal axes of said slots be arranged so as intersect with one another.

Figure 8:
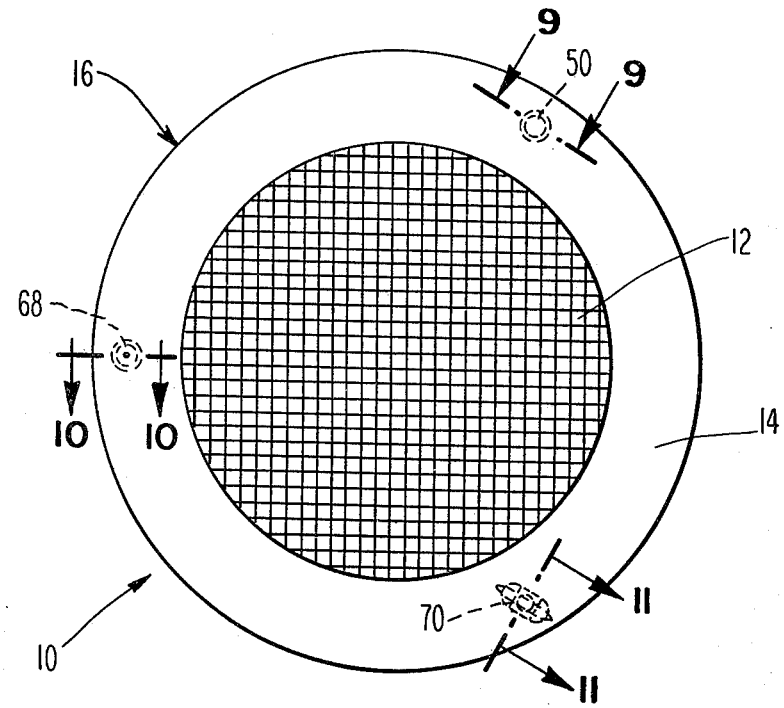
FIG. 8 is a bottom view of an extrusion die improved in accordance with another embodiment of the present invention.
Figure 9:
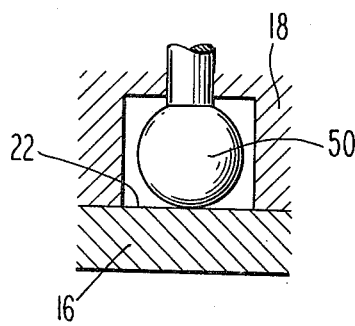
FIG. 9 is a cross-sectional view taken along line 9—9 of FIG. 8.
Figure 10:
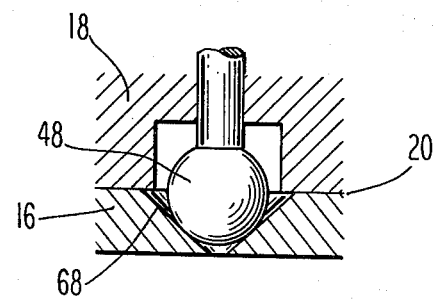
FIG. 10 is a cross-sectional view taken along line 10—10 of FIG. 8.
Figure 11:
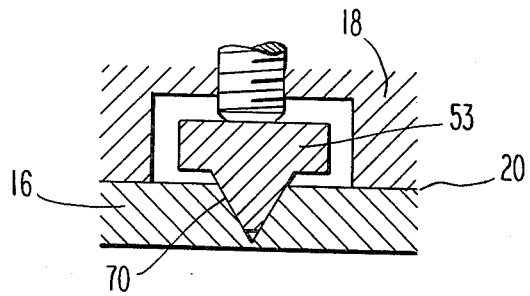
FIG. 11 is a cross-sectional view taken along line 11—11 of FIG. 8.

Referring now to FIGS. 8-11, another embodiment of the present invention is shown wherein like numerals are utilized to represent like elements shown in FIGS. 1-7. In the embodiment shown in FIGS. 8-11, a die means shown generally at 10 consists of a central portion 12 with a peripheral portion 14 extending thereabout. Like the embodiment of FIGS. 1-7, the die 10 of FIGS. 8-11 is comprised of a first body portion having an inlet face and an outlet face. The first body member is secured at a joint to a second body member having an inlet face and an outlet face. Feed passageways progress from the entrance face to the exit face of the second body member and are aligned with feed holes in the first body member which communicate with discharge slots opening to the outlet face thereof. In the embodiment shown in FIGS. 8 and 10, the first body member 16 employs a first alignment cavity 68 which opens to and diverges toward and to the joint 20 and which is substantially conically shaped. Moreover, as seen in FIGS. 8 and 11, the first body member 16 includes a second alignment cavity 70 which is an elongated slot. Pedestals 48 and 53 project from the first body member 18 across the joint 20 and mate with the alignment cavities 68 and 70, as shown, to prevent the relative movement and misalignment of the feed passageways 40 and feed holes 34 during the joinder of the first body member 16 to the second body member 18. A third pedestal 50 projects from the first body member 18 and rests directly upon the inlet face 22 of the first body member 16 but does not mate with an alginment cavity therein.

In addition to the case of pedestals having a rounded extremity, the pedestals may comprise a converging V-block such as that shown at 53 in FIG. 11.

The arrangement shown in FIGS. 8–11 eliminates costly machining in the location of alignment cavities. So long as the pedestal 48 is properly mated with alignment cavity 68 and pedestal 53 located at any point along the longitudinal axis of elongated alignment slot 70, the relative horizontal positions of first and second body members 16 and 18 is fixed.

While a particular embodiment has been shown and described, it will be apparent to those skilled in the art that various changes and modifications may be made without departing from the spirit and scope of the present invention as defined by the appended claims.

What is claimed is:

1. In an extrusion die for forming honeycomb structures of the type having:
a first body member having an inlet face and an outlet face, a first plurality of feed holes opening to said inlet face and communicating with a second plurality of interconnected discharge slots opening to said outlet face; and
a second body member having an entrance face and an exit face, a third plurality of feed passageways extending through said second body member from said entrance face to said exit face;
said first and said second body members being adapted to be bonded to one another at a joint between said exit face and said inlet face, the improvement comprising:
a first alignment cavity in one of said body members opening to and diverging towards and to said joint;
at least another alignment cavity in either said one or the other of said body members, said another alignment cavity opening to and diverging towards and to said joint; and
at least first, second and third pedestals on the body member or members and projecting across or onto said joint, said first and said second pedestals projecting across said joint from the body member or members opposite to and mating with said first and said another alignment cavities respectively, said alignment cavities and pedestals restraining said body members from relative movement in two orthogonal directions but allowing relative movement therebetween in a third orthogonal direction perpendicular to the joint during bonding thereof.

2. The die of claim 1 wherein at least one of said alignment cavities is a conical depression.

3. The die of claim 2 wherein at least one of said alignment cavities is a longitudinal slot.

4. The die of claim 1 wherein all of said alignment cavities are longitudinal slots, the longitudinal axes of which intersect with one another.

5. The die of claim 1 further comprising a third alignment cavity in said one body member opening to and diverging towards and to said joint, said third pedestal mating with said third alignment cavity.

6. The die of claim 5 wherein said alignment cavities are longitudinal slots, the longitudinal axes of which intersect with one another.

7. The die of claim 1 wherein said pedestals each have a rounded extremity.

8. The die of claim 1 wherein said one body member comprises said first body member and wherein said other body member comprises said second body member.

9. The die of claim 8 wherein said alignment cavities are formed in said inlet face and wherein at least said first and second pedestals project above said exit face.

10. the die of claim 5 wherein said pedestals are spaced at 120° intervals about the circumference of said exit face.

11. The die of claim 1 wherein said pedestals are adjustable whereby the height thereof above said exit face is controllable.

12. The die of claim 1 wherein said walls of said cavities diverge at an angle of 100°.

13. The die of claim 1 wherein said one body member comprises said second body member and wherein said other body member comprises said first body member.

14. The die of claim 1 wherein said another alignment cavity is in said other of the body members.

15. The die of claim 1 wherein said first and another alignment cavities are in said one of the body members.

16. A method of making an extrusion die for forming honeycomb structures comprising the steps of:
providing a first body member having an inlet face and an outlet face, a first plurality of feed holes opening to said inlet face and communicating with a second plurality of interconnected discharge slots opening to said outlet face;
providing a second body member having an entrance face and an exit face, a third plurality of feed passageways extending through said body member from said entrance face to said exit face;
locating said first and said second body members adjacent one another such that said exit face and said inlet face are in abutting relationship to form a joint therebetween;
restraining said body members from movement in planes parallel to said joint by means of a plurality of alignment cavities opening to and diverging towards and to said joint and a plurality of pedestals projecting across said joint from the body member or members opposite to and mating with said cavities; and
bonding said first and said second body members to one another at said joint.

17. The method of claim 16 wherein said bonding is brazing.

* * * * *

UNITED STATES PATENT AND TRADEMARK OFFICE
CERTIFICATE OF CORRECTION

PATENT NO. : 4,321,025
DATED : March 23, 1982
INVENTOR(S) : George M. Cunningham It is certified that error appears in the above-identified patent and that said Letters Patent are hereby corrected as shown below:

It is certified that errors appear in the above-identified patent and that said Letters Patent are hereby corrected as shown below:

Column 2, line 13, "numbers" should read -- members --.

Column 5, line 6, "alginment" should read -- alignment --.

Column 5, line 13, the words "53 located" should read -- 53 is located --.

Signed and Sealed this

Twentieth Day of July 1982

[SEAL]

Attest:

Attesting Officer

GERALD J. MOSSINGHOFF
Commissioner of Patents and Trademarks